ND# United States Patent
Svopa, Jr. et al.

(10) Patent No.: US 8,636,816 B1
(45) Date of Patent: Jan. 28, 2014

(54) COMPOSITE WOOD PRODUCTS AND METHODS OF MANUFACTURE

(71) Applicants: Richard T. Svopa, Jr., Plymouth, MA (US); David Newton, Cotuit, MA (US)

(72) Inventors: Richard T. Svopa, Jr., Plymouth, MA (US); David Newton, Cotuit, MA (US)

(*) Notice: Subject to any disclaimer, the term of this patent is extended or adjusted under 35 U.S.C. 154(b) by 0 days.

(21) Appl. No.: 13/680,304

(22) Filed: Nov. 19, 2012

(51) Int. Cl.
*C10L 5/20* (2006.01)

(52) U.S. Cl.
USPC .................................. 44/578; 44/590; 44/606

(58) Field of Classification Search
USPC ........................................... 44/578, 590, 606
See application file for complete search history.

(56) References Cited

U.S. PATENT DOCUMENTS

| | | | |
|---|---|---|---|
| 3,635,684 A | 1/1972 | Seymour | |
| 4,230,459 A | 10/1980 | Moreau et al. | |
| 4,326,854 A * | 4/1982 | Tanner | 44/577 |
| 4,612,017 A * | 9/1986 | Lindell | 44/576 |
| 5,755,836 A | 5/1998 | Beyer | |
| 5,858,032 A | 1/1999 | Hardy et al. | |
| 2008/0216396 A1 * | 9/2008 | Bier | 44/554 |

FOREIGN PATENT DOCUMENTS

| | | |
|---|---|---|
| JP | 2006315316 A | 11/2006 |
| RU | 2033319 C1 | 4/1995 |
| WO | WO-2005023532 A1 | 3/2005 |
| WO | WO-2011062488 A1 | 5/2011 |

OTHER PUBLICATIONS http://www.chinasltd.com/news/industrynews/229.html, downloaded Nov. 13, 2012, 4 pages.

* cited by examiner

*Primary Examiner* — Cephia D Toomer
(74) *Attorney, Agent, or Firm* — Goodwin Procter LLP (57) ABSTRACT

A composite wood product adapted for burning includes a compacted mixture of lignosulfonate, wood particles, and ground corn. A method of manufacturing the composite wood product includes: (i) providing and mixing the lignosulfonate, the wood particles, and the ground corn to form a mixture having a moisture content from about 6 wt. % to about 18 wt. %; compacting the mixture at high pressure; and drying the mixture to obtain an optimum moisture level for burning. The composite wood product may be provided in a kit that includes log-shaped pieces and starter pieces.

21 Claims, 9 Drawing Sheets

COMPOSITE WOOD PRODUCTS AND METHODS OF MANUFACTURE

TECHNICAL FIELD

In various embodiments, the invention relates to wood composite materials and, more particularly, wood composite materials adapted to be burned for cooking or heating applications.

BACKGROUND

Grilling with wood, which delivers the most natural grilling flavor due to the nature and composition of the smoke produced during the burning process, has never been simple. Natural wood pieces that are sized in chunks meant for a backyard grill either burn too quickly (i.e., if they are dry enough to burn) or are difficult to light and do not emit enough heat for cooking (i.e., if they are too wet). Wood also tends to pop and spark when burning, which can be dangerous.

Traditionally, charcoal is used as a replacement for wood, but charcoal does not emit the true flavor of wood. To achieve a wood flavor, wood chips, such as apple, cherry, or hickory, may be added to the charcoal, depending on the specific wood flavor desired.

Charcoal is generally burned out wood and other elements that do not burn completely, resulting in large amounts of ash. Charcoal is dirty, difficult to light, bad for the environment, and lacks the true aroma of wood. Some charcoal or pellet products include binders, such as waxes or petroleum derivatives, to hold the products together during combustion. These binders produce excess smoke and/or odors that impart an unpleasant taste into the food and/or make the grilling experience less satisfying. Additionally, unlike traditional wood pieces that remain intact while burning, certain charcoal and pellet products fall apart after ignition. These products are difficult to manipulate to adjust or redistribute the heat of the fire.

Traditional cordwood fires include a stack of firewood ignited with newspaper and kindling wood piled between and underneath larger logs. Although fast burning, the quick ignition of the paper and kindling are typically sufficient to ignite the larger logs. Fire, by nature, climbs and develops by climbing, which is why traditional cordwood fires generally require a relatively large stack of wood to get the fire started. A problem with cordwood, however, is its tendency to spark, pop, and/or topple over during the burn process. Cordwood fires may also produce excess amounts of smoke, for example, due to the high moisture content found in wood, even kiln-dried wood. It is difficult to obtain a moisture content of less than 15% in even the driest of cordwood.

Manufactured logs that are packaged in bags with instructions to light the bag generally include either petroleum or biowax as the main ingredient, with wood material as a secondary ingredient. These manufactured logs tend to light quickly, without the use of starter material, such as kindling. While these logs generally produce a nice early flame, the logs tend to produce lackluster flames during the remainder of the burn, with some improvement as the logs split apart, allowing higher concentrations of wax materials to ignite. Due to the large amount of wax present in these logs, many of the logs have a long burn duration. The fire, however, does not compare to a traditional cordwood fire, particularly with respect to flame quality and aroma. For example, wax logs generally produce a thick, foul-smelling, black smoke, which may enter a dwelling, for example, during back drafts. Additionally, prior to burning, the wax logs emit unpleasant odors and generally require sealed bags to contain these odors. The logs also produce a sticky residue that lines chimneys and flues. Because of the unpleasant and potentially harmful fumes, wax logs are not recommended for cooking.

Needs exist, therefore, for improved wood products for grilling, heating, and building fires. In particular, needs exist for wood products that are easy to ignite, easy to manipulate while burning, produce a pleasant aroma, add natural flavors derived from the flame and smoke, and generate sufficient heat and flames, over an extended period of time.

SUMMARY OF THE INVENTION

Embodiments of the invention include a composite wood product that eliminates or minimizes many of the problems associated with the use of wood or charcoal for grilling and heating. For example, due to the compressed nature of the wood product, the product burns at a higher temperature, and for a longer duration, compared to regular wood. Unlike previous compressed wood materials, the wood product remains intact throughout the entire burn, thereby extending the overall burning duration and available cooking or heating time. The product achieves a complete or near complete burn, producing very little ash compared to both charcoal and wood chunks. The product also does not include any added wax or petroleum-based binders, and produces a pleasant aroma, with little or no malodorous constituents, when burned. In addition, the size and shape of the product allow for extremely fast ignition, thereby minimizing the time required to establish a cooking fire and maximizing the flame across the cooking area. Further, unlike regular wood, which tends to pop and spark, the product burns without popping or sparking, making it extremely safe. The product is suitable for use in any grilling device where wood or charcoal is the normal fuel. The product is also suitable for use in wood stoves, fireplaces, or chimineas, for example, as a substitute for cordwood or wax-based fire logs.

In general, in one aspect, embodiments of the invention relate to a composite wood product adapted for burning. The composite wood product includes lignosulfonate in an amount from about 0.5 wt. % to about 6 wt. %, wood particles, and ground corn. The lignosulfonate, the wood particles, and the ground corn form a substantially homogeneous mixture.

In certain embodiments, the lignosulfonate is or includes powdered calcium lignosulfonate. In one embodiment, the wood particles are present in the composite in an amount of up to about 96 wt. %. The ground corn may be present, for example, in an amount from about 2.5 wt. % to about 6 wt. %. In some embodiments, the wood particles are sized to pass through a ⅜ inch screen.

In certain embodiments, the substantially homogeneous mixture includes a moisture content less of than about 10 percent. In general, the composite (e.g., the smoke from the composite) is characterized by an absence of malodorous constituents. The composite may also include one or more herbs, spices, or both. In some embodiments, the composite includes fatty acids in an amount less than about 0.1 wt. %. In one embodiment, the composite includes petroleum-based constituents in an amount less than about 0.1 wt. %. The composite may be configured in the shape of, for example, a disk, a cylinder, a half-cylinder, a bar with a square cross-section, a bar with a square cross-section and rounded edges, and portions thereof.

In another aspect, the invention relates to a method of manufacturing a composite wood product adapted for burning. The method includes the steps of: providing lignosulfonate, wood particles, and ground corn; mixing the lignosulfonate, the wood particles, and the ground corn to produce a substantially homogeneous mixture having a moisture content from about 6 wt. % to about 18 wt. %; compacting the substantially homogeneous mixture; and drying the substantially homogeneous mixture to a moisture content less than 10 wt. % to produce the composite wood product adapted for burning.

In certain embodiments, the compacting step includes pressing the substantially homogeneous mixture at a pressure greater than about 1500 psi. The lignosulfonate may be provided, for example, in an amount from about 1.0 wt. % to about 6 wt. %. The wood particles may be provided, for example, in an amount of up to about 96 wt. %. Likewise, the ground corn may be provided, for example, in an amount from about 2.5 wt. % to about 6 wt. %. In some embodiments, the wood particles are sized to pass through a 3/8 inch screen. The wood product mixture may include one or more herbs, spices, or both.

In another aspect, the invention relates to a method of using a composite wood product adapted for burning. The method includes the steps of: providing a composite wood product having a homogeneous blend of lignosulfonate in an amount from about 1.0 wt. % to about 6 wt. %, wood particles, and ground corn; and burning the composite wood product to produce smoke characterized by a lack of malodorous content.

In various embodiments, the ground corn is present in the composite in an amount from about 2.5 wt. % to about 6 wt. %. The wood particles may be sized to pass through a 3/8 inch screen. The composite wood product may include one or more herbs, spices, or both. In some embodiments, the composite wood product includes a plurality of log-shaped pieces and a plurality of starter pieces. The method may also include the step of arranging the plurality of log-shaped pieces in a bottom layer and placing the plurality of starter pieces on top of the bottom layer. In one embodiment, the method includes starting a fire by igniting the plurality of starter pieces on top of the bottom layer.

In another aspect, the invention relates to a kit for building a fire. The kit includes a plurality of log-shaped pieces and a plurality of starter pieces. At least one of the plurality of log-shaped pieces and the plurality of starter pieces includes lignosulfonate in an amount from about 0.5 wt. % to about 6 wt. %, wood particles, and ground corn. The lignosulfonate, the wood particles, and the ground corn include a substantially homogeneous mixture.

In various embodiments, the plurality of log-shaped pieces includes at least four log-shaped pieces. For example, the plurality of log-shaped pieces may include about six log-shaped pieces. In some embodiments, the plurality of starter pieces includes at least eight starter pieces. For example, the plurality of starter pieces may include about 15 starter pieces. In one embodiment, the log-shaped pieces are configured to be arranged in a bottom layer of the fire, and the starter pieces are configured to be arranged on top of the bottom layer. For example, the starter pieces may be configured to be arranged in at least two layers on top of the bottom layer. The kit may include at least one fire igniter.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

It is contemplated that systems, devices, methods, and processes of the claimed invention encompass variations and adaptations developed using information from the embodiments described herein. Adaptation and/or modification of the systems, devices, methods, and processes described herein may be performed by those of ordinary skill in the relevant art.

Throughout the description, where systems and devices are described as having, including, or comprising specific components, or where processes and methods are described as having, including, or comprising specific steps, it is contemplated that, additionally, there are systems of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

In certain embodiments, a composite wood product adapted for burning includes a compressed blend of powder, wood particles, and ground corn. The powder may be any type of powder (e.g., wood powder) capable of providing the composite with the desired structural and combustion properties. In one embodiment, the powder is or includes a lignosulfonate. For example, the powder may be or may include 100 percent calcium lignosulfonate. A preferred type of powder is or includes, for example, LignoBond DD, available from LignoTech USA, Inc., Rothschild, Wis., USA. Referring to Table 1, the powder may be present in the wood product in an amount from about 0.5 wt. % to about 6 wt. %, or from about 0.5 wt. % to about 2.5 wt. %, for example, depending on the manufacturing process used to produce the wood product, as described below. In general, inclusion of the powder in the wood product helps the product remain intact longer during the burning process, and reduces breakage and/or crumbling that may occur during shipping or handling. Unless otherwise specified, all weight percentage (wt. %) values presented herein are calculated on a dry basis (i.e., the mass of an ingredient divided by the total mass of all dry ingredients).

The lignosulfonate is generally a soluble fiber of plant origin, and may provide metabolizable energy and/or act as a prebiotic. While a preferred form for the lignosulfonate is a powdered form, other forms of lignosulfonate may also be used, such as other solid forms having larger particle sizes, or a liquid or slurry form.

The wood particles are or include a collection of wood pieces or chunks of one or more sizes. The wood particles may include any type of wood, for example, maple, oak, apple, cherry, hickory, birch, chestnut, walnut, ash, cedar, and/or various softwood specimens such as spruce or fir, depending on the wood supply and the desired characteristics of the fire and smoke. The wood particles may be made from recycled wood materials. For example, the wood particles may be or may include recycled wood products discarded by the construction industry and/or sawmills. Maximum, minimum, and typical sizes for the wood particles are provided in Table 1.

TABLE 1

| Parameter | Min. | Typical | Max. |
|---|---|---|---|
| Amount of Powder in Wood Product (wt. %) | 0.5 | 2.5 | 6 |
| Amount of Wood Particles in Wood Product (wt. %) | 84 | 92 | 98.5 |
| Size of Wood Particles (inches) | 0.001 | 0.25 | 1 |
| Amount of Corn in Wood Product (wt. %) | 1 | 4 | 10 |
| Moisture Content of Wood Product Before Compacting (wt. %) | 6 | 10 | 18 |
| Moisture Content of Wood Product after Drying. (wt. %) | 1 | 8.5 | 10 |
| Compacting Pressure (psi) | 1500 | 2500 | 80,000 |
| Compacting Temperature (° C.) | 20 | 150 | 180 |
| Radius R of Wood Product (inches) | 0.5 | 1.5 | 2 |
| Cross-Dimension D of Wood Product (inches) | 1 | 2.5 | 4 |
| Axial Length L of Wood Product (inches) | 0.5 | 1.5 | 20 |
| Core Cross-Dimension C (inches) | 0.2 | 0.6 | 1.8 |
| Specific Gravity of Wood Product | 1.2 | 1.3 | 1.4 |
| Burning Temperature (° F) | 1200 | 1550 | 1700 |
| Total Burn Time (min) | 35 | 55 | 120 |

Table 1. Exemplary Product Parameters.

The wood particles are generally formed by cutting or grinding large pieces of wood (e.g., logs) into smaller pieces using multiple grinding steps, for example, a rough grinder with a 1 inch screen, followed by passage across a magnet and metal detector via a conveyor to remove any metals, before further grinding is performed. A second grinder (e.g., a hammermill) may include a screen to permit passage of small particles and prevent passage of large particles. For example, to obtain particle sizes less than 3/8 inches, a 3/8 inch screen may be utilized. In one embodiment, the wood is processed through a rough grinder having a large screen (e.g., a 1.5 inch screen), followed by subsequent processing through a hammermill having a smaller screen (e.g., a 3/8 inch screen). A blower or vacuum system may be used to extract the particles from the screen and/or deliver the particles to a storage facility. Use of the blower or vacuum is generally faster than pressing the particles through the screen and/or transporting the particles on a conveyor belt. The wood dust generated during grinding may be included in the wood product. In general, the wood particles provide the wood product with sufficient coarseness to prevent excess expansion during the burning process, a key factor that makes the product a reliable cooking fuel for the grill.

The ground corn typically is or includes ground corn kernels. A preferred type of corn is feed corn, which is generally not filtered as much as other types of corn, and includes minimal husks. The corn may be present in the wood product in, for example, an amount from about 1% to about 10%, by weight, or preferably from about 2.5% to about 6%, by weight. Maximum, minimum, and typical values for the amount of corn in the wood product are provided in Table 1. In some embodiments, the amount of ground corn used in the wood product depends on the amount of powder utilized. For example, when more ground corn is included, less powder may be required.

The ground corn may be prepared using a grinding device (e.g., a hammermill, a blender, or other cutting device) and may have any particle sizes. In one embodiment, feed corn kernels are sent through a hammermill along with wood pieces to prepare the ground corn and the wood particles at the same time. Alternatively, the ground corn may be prepared in a separate grinding process and/or stored separately from the wood particles.

It is presently found that ground corn has a natural stickiness when heated and/or compressed with the other constituents of the wood product. The stickiness of the ground corn assists with the binding of the wood product constituents and provides additional heat output when the wood product is burned. The ground corn also causes the wood product to turn a pleasing caramel color during the initial burning phase, before the wood product turns black.

Figure 1:
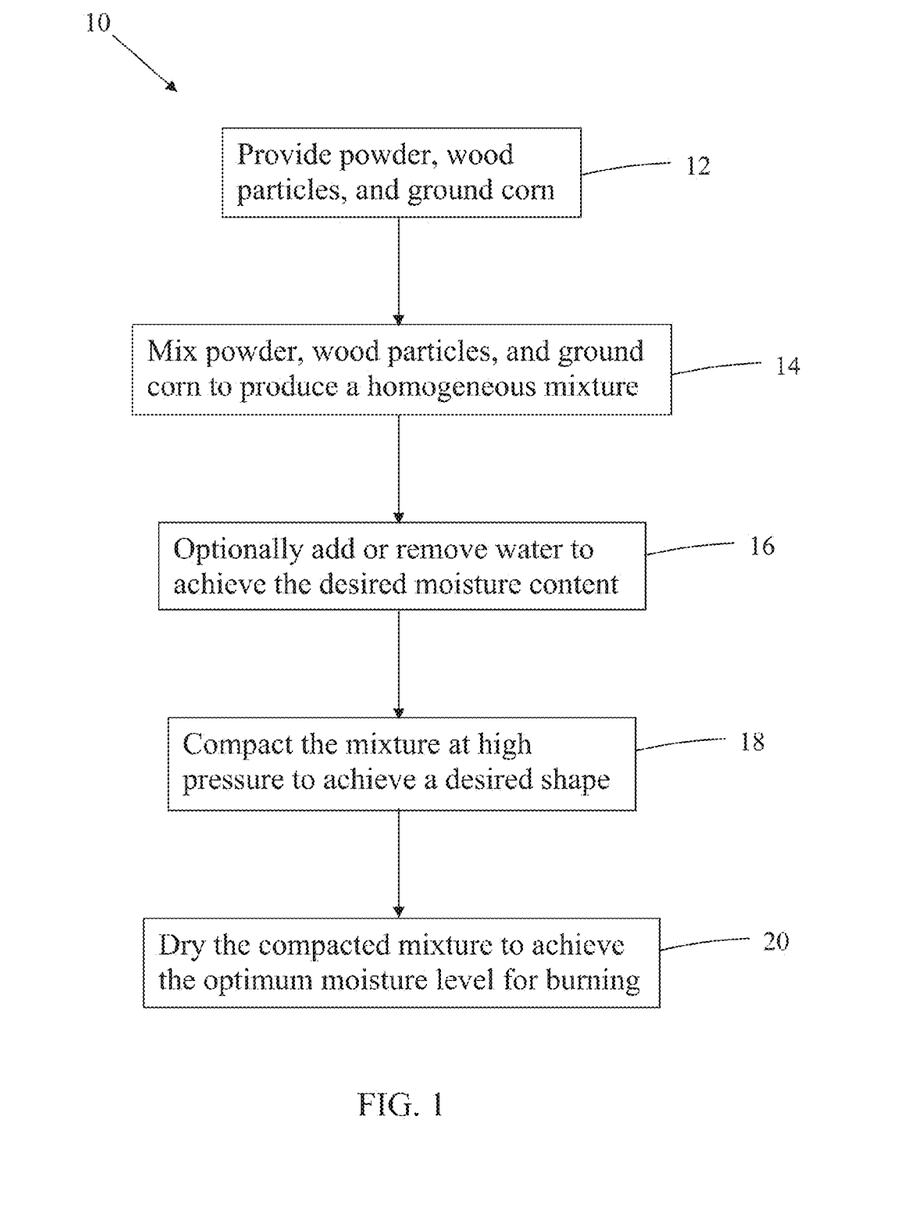
FIG. 1 is a flowchart of a method of manufacturing a wood product, in accordance with one embodiment of the invention.

Referring to FIG. 1, a method 10 of preparing the wood product includes providing (step 12) the powder, the wood particles, and the ground corn. The powder, the wood particles, and the ground corn are then mixed (step 14) to produce a homogeneous mixture. Water is optionally added (step 16) or removed, as needed, to achieve a moisture content for the mixture from about 6 wt. % to about 18 wt. %, or preferably about 10 wt. %. For example, the moisture content may be adjusted by adding saw dust and/or shavings having a particular moisture content (e.g., 7%). Next, the mixture is compacted (step 18) at high pressure into a desired shape, such as a cylinder or disk. The pressure for the compacting step 18 may be, for example, about 2500 psi, although much higher pressures (e.g., 60,000 psi) may be utilized, as described below. The temperature of the mixture during the compacting step is typically about 150° C., although higher or lower temperatures may be utilized. In one implementation, the mixture is compacted in a heated die. Minimum and maximum pressure values and temperature values for the compacting step 18 are provided in Table 1. In various embodiments, the specific combination of ingredients (including the moisture content) and environmental elements (e.g., pressure and/or temperature) triggers a natural binding of the wood product. Finally, the compacted mixture is dried (step 20) to a moisture level of about 8.5% or less for optimum burning performance.

In some embodiments, the compacting step 18 is performed in a screw press. The screw press may be capable of achieving greater pressures (e.g., up to about 60,000 psi) and/or rates of compression than other pressing devices. Higher pressures generally result in wood products that are stronger and/or more dense. The higher density may reduce chipping or flaking of the end product during handling, increase the ignition time slightly, and extend the overall burn time. The higher density product may also hold together stronger during the burn, with less expansion and a longer ember-like burn time, after flames have stopped, thus extending cooking time. In addition, higher compression rates in the screw press may generate more heat, causing more moisture to escape during the compacting step 18. With the screw press, the starting moisture content is preferably no higher than 10 wt. %. After pressing, the pressed product may be cooled and dried to a moisture content of less than about six wt. %, less than about four wt. %, or preferably about 2 wt. %. Temperatures within the screw press may reach about 160° C. At this temperature, outer surfaces of the wood product may carmelize and turn a darker brown color. For example, the corn and/or lignin from the powder at the outer surfaces may carmelize. In some embodiments, the screw press is used to perform an extrusion process. As the extruded material exits the screw press, the material may be cut to desired lengths.

In certain embodiments, use of the screw press reduces the amount of powder that is needed or included in the wood product. For example, when the compacting pressure is about 2500 psi, the powder may be present in the wood product in an amount from about 0.5 wt. % to about 6 wt. %. Alternatively, when the compacting pressure is 40,000 psi or higher, for example, the powder may be present in the wood product in an amount from about 0.5 wt. % to about 2.5 wt. %. In general, the higher compacting pressures improve the bonding among the wood product constituents such that less powder is used or required to achieve the desired bonding. Further, with the higher compacting temperatures (e.g., 160° C.) in the screw press, less moisture (e.g., 10 wt. % or less) may be needed during the compacting step 18 to activate the powder. Due to the lower initial moisture content, the resulting wood product is generally drier and therefore easier to ignite and burn.

In certain embodiments, the wood product is more dense than cordwood and wax-based fire logs. For example, the specific gravity of the wood product may be from about 1.2 to about 1.4, or about 1.3. By comparison, the specific gravity of most hardwoods, including maple and oak, is about 0.75, and the specific gravity of the wax used in wax fire logs is about 0.9. Advantageously, the high density of the wood product may provide increased structural integrity, better flame and ember quality, and/or greater burn duration.

Figure 2:
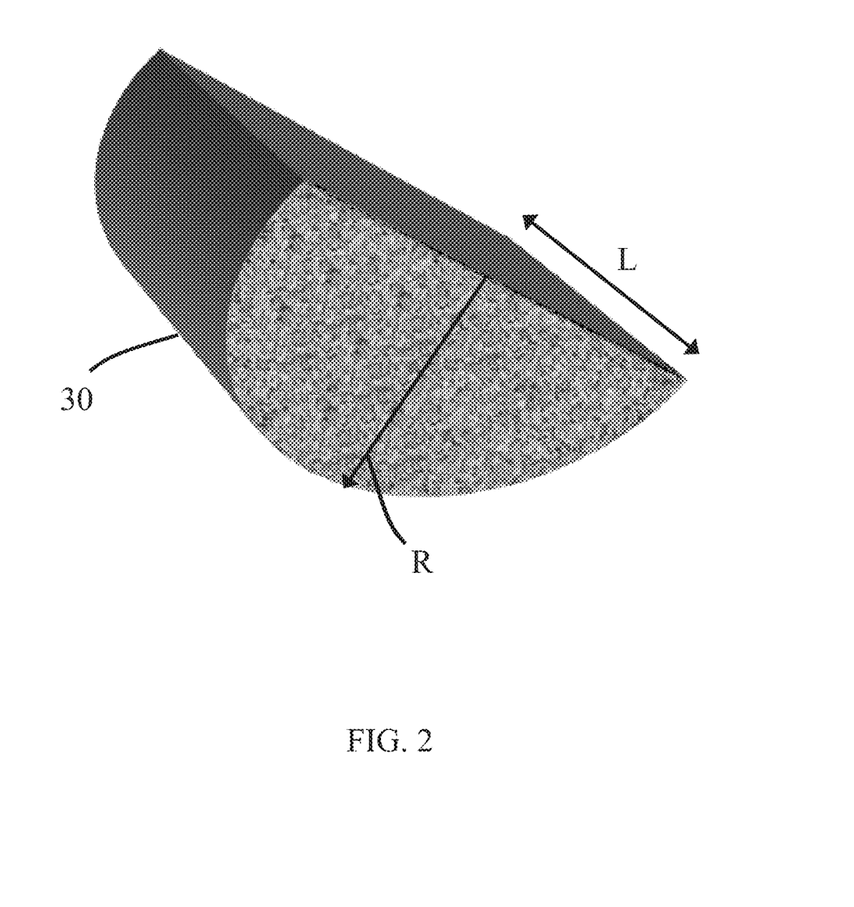
FIG. 2 is a schematic perspective view of a wood product having a half-cylindrical shape, in accordance with one embodiment of the invention.

In general, the wood product may have any shape that provides desired rates of ignition and combustion. For example, referring to FIG. 2, the wood product may be in the form of a half-cylinder 30 having a radius R and an axial length L. In one embodiment, the radius R is about 1.5 inches and the axial length L is about two inches. The wood product may include an internal void to provide additional surface area.

Figure 3:
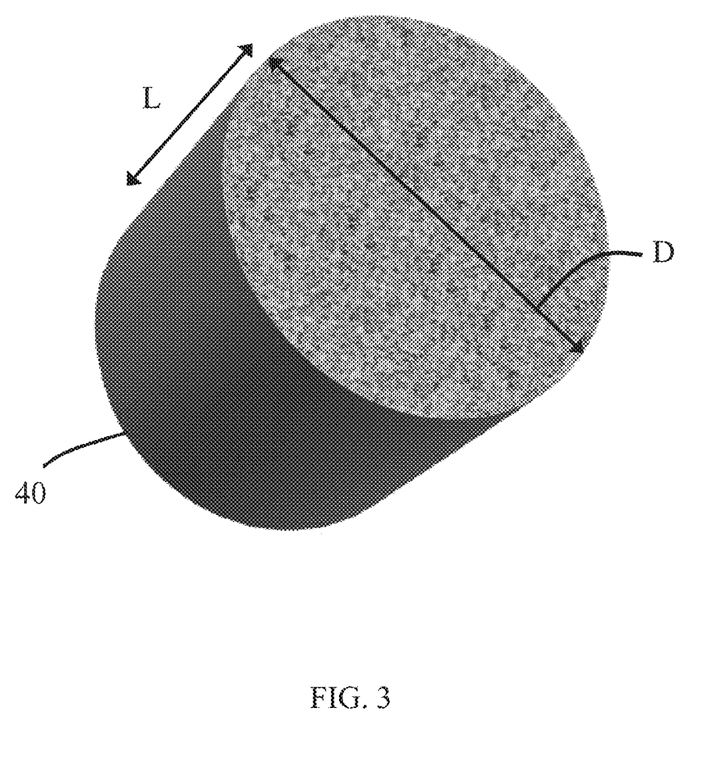
FIG. 3 is a schematic perspective view of a wood product having a cylindrical shape, in accordance with one embodiment of the invention.
Figure 4:
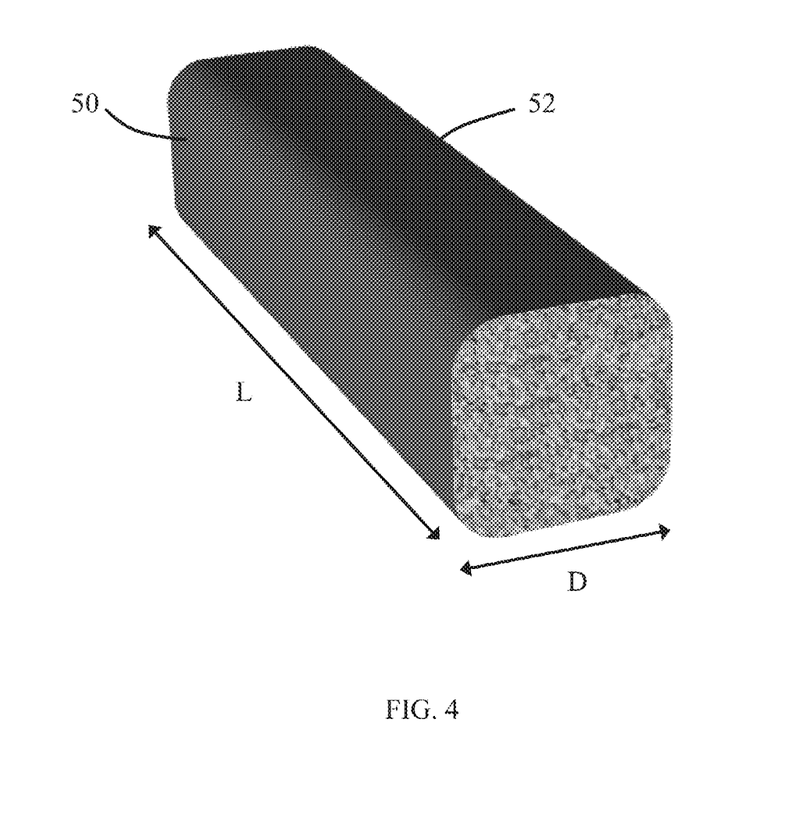
FIG. 4 is a schematic perspective view of a wood product having a square cross-section with rounded edges, in accordance with one embodiment of the invention.

In various embodiments, the wood product is shaped like a rod or bar and may have any cross-sectional shape, including circular, semi-circular, triangular, square, rectangular, pentagonal, hexagonal, and combinations thereof. An axial length L of the rod may be, for example, from about one inch to about 20 inches. A cross-dimension D of the rod may be, for example, from about one inch to about 3 inches. A ratio of the axial length L to the cross-dimension D may be, for example, from about 0.5 to about ten. For example, referring to FIG. 3, the wood product may be in the form a cylinder 40 (i.e., a bar with a circular cross-section) in which the cross-dimension D and the axial length L are each about two inches. A larger cylinder may have a cross-dimension D of about 2.75 inches and an axial length L of about 3.25 inches. The creation of cylinders rather than the half-cylinders described above may be preferable to avoid an additional manufacturing step of cutting the cylinders in half. In some embodiments, one or more edges on the rod are rounded. For example, referring to FIG. 4, the wood product may be in the form of a rod 50 having a square cross-section and rounded edges 52. The cross-dimension D and the axial length L may each be about 2.25 inches. Alternatively, the axial length L may be up to about 20 inches. In general, the shape and size of the wood product are chosen to achieve fast ignition, long burn duration (e.g., 35 minutes or more), and an even heat distribution across the burning pieces. Maximum, minimum, and typical values for the radius R, cross-dimension D, and axial length L are provided in Table 1.

Figure 5:
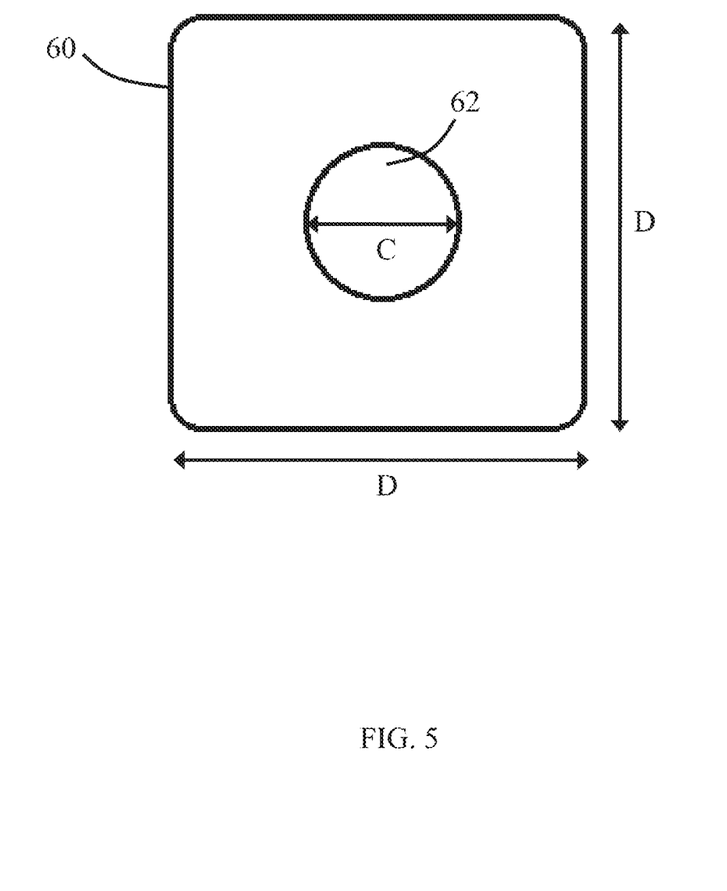
FIG. 5 is a schematic cross-sectional view of a wood product having a hollow core and a square cross-section with rounded edges, in accordance with one embodiment of the invention.

Referring to FIG. 5, in some embodiments, a wood product 60 includes a hollow core 62. The hollow core 62 may extend all the way through the wood product 60, for example, from one surface to an opposite surface. Alternatively, the hollow core 62 may extend through only a portion of the wood product 60, for example, to form a pocket. The hollow core 62 may have any cross-sectional shape, including circular, as depicted. The cross-dimension D of the wood product 60 is preferably about 2.4 inches, or from about 1.2 inches to about 3.5 inches. A core cross-dimension C is preferably about 0.6 inches, or from about 0.2 inches to about 1.8 inches. The axial length L of the wood product 60 may be, for example, from about 0.8 inches to about 16 inches, depending upon the application. For example, when the wood product 60 is to be used for cooking or grilling, the axial length L may be from about 0.8 inches to about 1.6 inches. In one embodiment, for cooking or grilling, the cross-dimension D is about 2 inches, the core cross-dimension C is about 0.4 inches, and the wood product 60 has a square cross-section with rounded edges. When the wood product 60 is to be used in a fireplace or woodstove, the axial length L may be, for example, up to about 16 inches, or greater.

In certain embodiments, adding the hollow core 62 to the wood product 60 enhances burning performance and/or improves the manufacturing process. For example, the hollow core 62 may enhance airflow during combustion, particularly when multiple pieces of the wood product 60 are in a stacked configuration. In general, the hollow core 62 promotes airflow through the wood product 60, regardless of how the wood product 60 is stacked. In some instances, without the hollow core 62, the fire may suffocate due to a lack of airflow. The hollow core 62 may also produce swirling flames that originate from and/or shoot through the hollow core 62 for a great visual effect, as the product burns.

Further, by including the hollow core 62 in the wood product 60, the method 10 of forming the wood product 60 may be enhanced. For example, the hollow core 62 may allow moisture to escape during the compacting step 18 and/or the drying step 20, thereby reducing the amount of time required for drying.

To add aromas and/or enhance the flavors of the cooked food, various embodiments of the wood product include one or more herbs, spices, or other seasonings. The herbs and spices may be or include, for example, basil, chives, cinnamon, cumin, garlic, ginger, mint, mustard, nutmeg, oregano, paprika, pepper, rosemary, sage, and thyme. The one or more herbs and spices may be present in the wood product in an amount up to about two wt. %, or preferably up to about one wt. %. The herbs and/or spices may be added to the homogeneous mixture in step 14 of the method 10, described above.

In general, the wood product described herein may be ignited using any suitable technique, which may or may not use additional fuel or heating devices. For example, the wood product may be ignited using standard ignition techniques employed for charcoal, including lighter fluid, and electric starter, and/or a chimney starter.

The wood product described herein provides several benefits over previous wood composite products intended for burning. For example, previous products simply fall apart shortly after ignition, making them poor candidates for grilling where the cook must often manipulate the fire or adjust the burning material to best suit the specific food being prepared. Further, the combination of ingredients in the wood product, with no waxes or petroleum-based materials, emits a pleasant, mild aroma during burning, with little or no malodorous content (e.g., no smell of chemicals). The smoke from the wood product is generally much less harsh than smoke from standard wood grindings or charcoal.

As mentioned, a preferred type of powder for the wood product is calcium lignosulphonate. In certain embodiments, the smoke produced by burning the wood product containing calcium lignosulphonate is the same as or very similar to that produced when burning pure wood. The smoke typically has a pleasant odor that imparts a natural wood flavor into the food being prepared. In some instances, other types of lignosulphonates (e.g., sodium lignosulfonate) may result in unpleasant odors. For example, thick black smoke and/or unpleasant odors may be observed.

In various embodiments, the mixture of ingredients and processing parameters described herein triggers a powerful binding process that keeps the wood product held together throughout the burn. Previous standard pellet creation practices do not involve the different varieties of granular material, especially the addition of ground corn and powder, which are important elements in the longstanding binding process. By compacting the powder, the wood particles, and the ground corn, as described above, a very hard product is produced that burns much hotter and longer than any other pelletized product of the same equivalent size.

Advantageously, due at least in part to the natural binding that occurs between the constituents of the wood product, additional binders, such as fatty acids, waxes, and/or petroleum-based materials, are not needed. In general, the wood product is made from clean natural wood products, without the use of chemical additives of any kind, including fatty acids, waxes, oils, glues, paraffin, and/or petroleum-based materials. In some embodiments, however, the wood product may include trace amounts (e.g., less than 0.1 wt. %) of fatty acids, waxes, and/or petroleum-based materials.

The wood product described herein may be used for various heating and cooking applications. For example, the wood product may be used at a recreational level as an alternative form of firewood that does not spark or pop, thus reducing the risk of forest fires. The product may also be used as an all-natural fire starter in any setting (e.g., a fireplace or a woodstove) where wood or other fuel is burned. In outdoor grills, the wood product provides a cleaner, more flavorful, and more environmentally friendly alternative to charcoal and gas. The wood product may also be used in fireplaces, woodstoves, outdoor fire pits, chimineas, campfires, etc., as a source of heat or ambience. Commercial uses of the wood product include use in wood-fired furnaces, and use in restaurants for brick ovens or grills. Finally, use of the wood product in campgrounds and state or federal parks may prevent the spread of insects or disease that occurs due to the transportation of cordwood over long distances.

Pound-for-pound, compared to cordwood, the wood product described herein burns three times longer and produces three times the heat. The wood product is cleaner-burning—emitting less carbon dioxide and other greenhouse gases—and is insect-free, easier to store, and burns more evenly, without sparks. The wood product burns clean and with almost none of the black smoke and creosote that is associated with wax-filled logs and cordwood.

As explained above, in certain embodiments, the wood product is held together as a result of the compacting step 18 and the combination of ingredients, including the powder (e.g., trace amounts of added natural lignin). Unlike cordwood, the wood product has an overall moisture content of less than about 5%, which is much lower than the moisture content of cordwood. The low moisture content of the wood product prevents sparking and popping. The wood product also does not shrink as rapidly or as much as cordwood, while burning, so the wood product does not tend to fall apart or topple over. These traits allow the wood product to create a cleaner, safer fire than that produced with cordwood, without the unpleasant odors obtained with wax logs.

Referring to FIGS. 6A through 6E, in various embodiments, the wood product described herein is packaged as a kit 70 for building and igniting a fire. The kit 70 includes a plurality of log-shaped pieces 72, and a plurality of disk-shaped or starter pieces 74. For the log-shaped pieces 72, the axial length L is preferably greater than the cross-dimension D. For example, the log-shaped pieces 72 may have an axial length L of about eight inches and a cross-dimension D of about 2.5 inches. For the starter pieces 74, the axial length L is preferably shorter than the cross-dimension D. For example, the starter pieces 74 may have an axial length L of about one inch and a cross-dimension D of about 2.5 inches. Both the log-shaped pieces 72 and the starter pieces 74 may include, for example, a square cross-section with rounded corners. The log-shaped pieces 72 and/or the starter pieces 74 may include a hollow core.

Figure 6A:
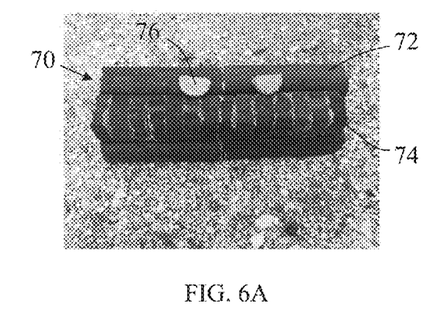
FIGS. 6A-6E include photographs of a wood product provided as a kit that includes log-shaped pieces and starter pieces, in accordance with one embodiment of the invention.
Figure 6B:
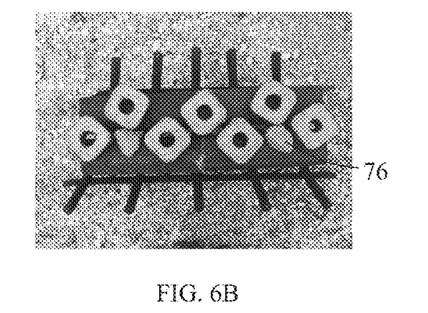

In some embodiments, the kit 70 includes from about two to about eight log-shaped pieces 72, and from about four to about 30 starter pieces 74. For example, in the depicted embodiment, the kit 70 includes six log-shaped pieces 72 and 14 starter pieces 74. The kit 70 may also include one or more fire igniter pieces 76, which may be or include, for example, pinewood, pinewood resin, saw dust, pine sap, and/or wax. In the depicted embodiment, the kit 70 includes two fire igniter pieces 76. FIG. 6A is a photograph depicting how the contents of the kit 70 may be arranged inside a carry away bag or other container.

Compared to previous products for building fires, the kit 70 includes pieces having different sizes to maximize the ease and speed at which a consumer can achieve a desirable flaming product. For example, in one embodiment, the pieces are stacked in a reverse configuration 78 with the smaller starter pieces 74 placed on top of the larger log-shaped pieces 72, unlike a traditional fire in which smaller kindling is placed underneath larger logs. The reverse configuration 78 is presently found to produce a fire quickly, with the starter pieces 74 generally igniting faster than the log-shaped pieces 72. Unlike kindling wood, however, which ignites and burns quickly down to ash, the compressed nature of the wood product in the kit 70 allows even the starter pieces 74 to burn for an hour or more, and become very hot in the process. In one embodiment, by placing the starter pieces 74 in a stack on top of the log-shaped pieces 72, the consumer may enjoy a large fire as the flame proceeds or climbs through the stack. Eventually (e.g., within several minutes), the heat generated from the starter pieces 74 ignites the log-shaped pieces 72 underneath. This delayed ignition of the log-shaped pieces 72 results in an increased duration of the fire, without requiring additional fuel (e.g., log-shaped pieces). In general, the reverse configuration 78 provides a fire that is safer, cleaner, and longer burning than any fire obtained with other packed fire products, such as wax-based logs. Further, by placing the log-shaped pieces 78 at the bottom of the fire, to act as a base, the stack is stabilized and less likely to fall apart. In one embodiment, log-shaped pieces 72 with a square or polygonal cross-section promote stability of the stack. For example, a log-shaped piece 72 with a flat face is generally resistant to rolling out of the fire.

Figure 6C:
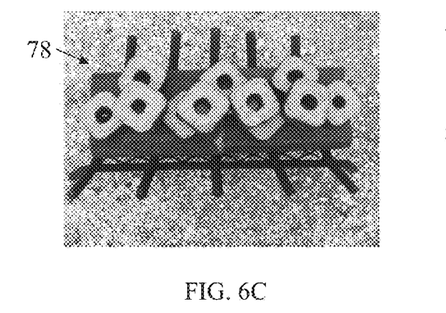
Figure 6D:
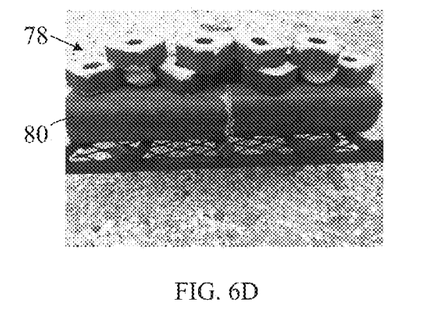
Figure 6E:
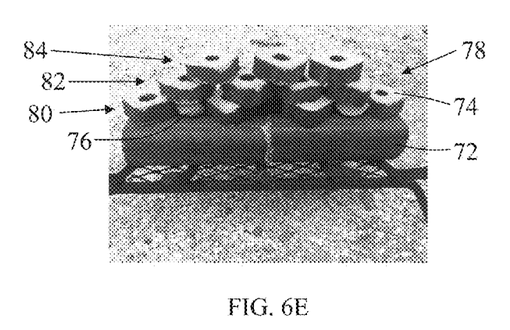

Referring to FIG. 6B through 6E, in certain embodiments, the components of the kit 70 may be arranged in the reverse configuration 78 such that four of the log-shaped pieces 72 form a bottom layer 80 in which the log-shaped pieces 72 are arranged in two rows. Within each row, two log-shaped pieces 72 are butted up against one another, for example, to form a 16 inch log from two eight inch log-shaped pieces 72. The two rows are preferably separated to form an air gap between the two rows. Next, a first layer 82 of starter pieces 74 may be formed by arranging a number (e.g., seven) of the starter pieces 74 on top of the bottom layer 80, with the starter pieces 74 preferably arranged from one end of the bottom layer 80 to an opposite end, for example, to create a wide profile fire. The fire igniters 76 are then placed between or among the starter pieces 74, preferably near the ends of the two rows in the bottom layer 80. Referring to FIGS. 6C and 6D, a second layer 84 of starter pieces 74 may be formed by placing a number (e.g., four) of the remaining starter pieces 74 on top of the first layer 82 of starter pieces. Finally, referring to FIG. 6E, a third layer 86 of starter pieces 74 may be formed by placing the remaining (e.g., three) starter pieces 74 on top of the second layer 84 of starter pieces 74. It is presently found that the three layers 82, 84, 86 of starter pieces 74 create enough draw on the initial flame from the fire igniters 76 to produce a sustainable fire.

Advantageously, when the kit 70 is used to build a fire as described above, a burn duration up to two or more hours may be achieved, without poking or adjusting the pieces after ignition. Like some waxed log products, the kit 70 provides the convenience of being able to ignite the fire and then leave it alone for the duration of the burn. Unlike these waxed products, however, the fire produced with the kit 70 does not generate unpleasant odors. Instead, the kit 70 achieves a fire as desirable as that achieved with regular cordwood, using a fraction of the volume, without the hassle of dirt, bugs, insects, and excessive smoke.

The kit 70 may be provided in various sizes, for example, with a different number and/or larger or smaller log-shaped pieces 72 or starter pieces 74. All pieces are preferably provided within a container, such as a box or a bag. Preferably, the container may be burned along with its contents. In one embodiment, some or all of the starter pieces 74 are contained within a sleeve inside the container. Because the wood product in the kit 70 is mostly pure wood (e.g., at least 95% pure wood), the kit 70 produces no foul fumes or aroma and may be stored nearly anywhere, including a garage, a basement, a living area, or outside.

EXPERIMENTS

A series of experiments were performed to evaluate the burning characteristics of the wood product described herein. In one experiment, the ignition time for the wood product was measured to be less than one minute.

In another experiment, the maximum burning temperature for the wood product was measured to be about 1550° F. By comparison, the maximum burning temperature of charcoal has been measured to be about 1200° F. Regarding duration of burn, the wood product has been observed to burn with flames for up to 35 minutes and in an ember state for an additional 40 minutes, for a total burn time of about 75 minutes per piece of wood product.

Additional testing was performed to evaluate the amount of smoke and the content of the smoke produced when the product is burned. In one test, the smoke was consistent with the smoke produced by burning wood, both in quantity and odor. Specifically, the smoke had a pleasant odor of burning wood, and did not contain detectable malodorous constituents. The amount of CO and $CO_2$ in the smoke was too low to detect. By comparison, in tests performed on similar amounts of both seasoned cordwood and various brands of wax logs, the amount of CO and $CO_2$ in the smoke was measured to be about 0.2205 lbs/sec.

In another test, the ash content of the wood product was measured. The results from the test show that the wood product has an ash content that is about $\frac{1}{16}$th of the ash content of charcoal. The ash content was measured to be from about 0.3% to about 0.6%, by weight, depending on the heat and size of the fire. In general, a hotter fire results in less ash.

Figure 7A:
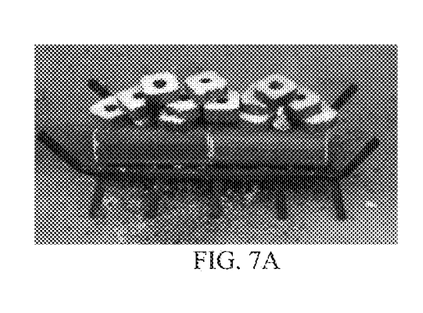
FIGS. 7A-7F include a sequence of photographs of a fire obtained with the kit of FIGS. 6A-6E, in accordance with one embodiment of the invention.
Figure 7B:
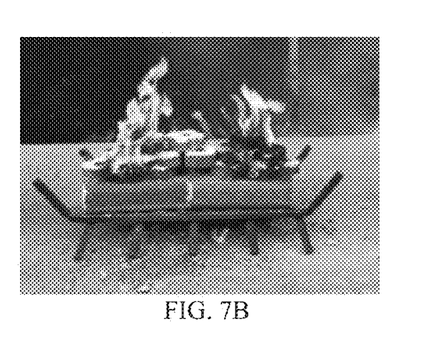
Figure 7C:
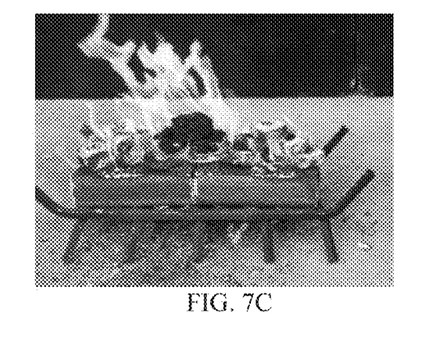
Figure 7D:
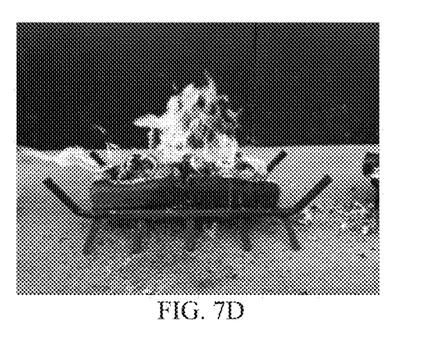
Figure 7E:
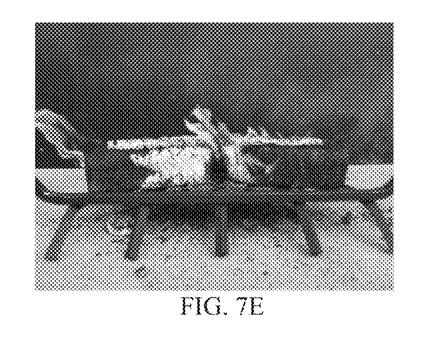
Figure 7F:
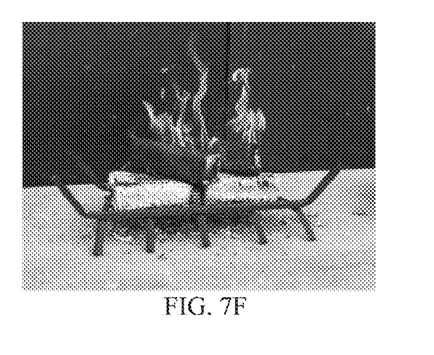
Figure 8A:
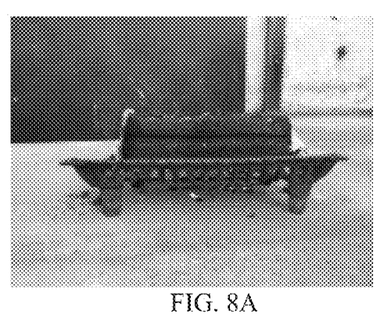
FIGS. 8A-8F include a sequence of photographs of a fire obtained with a wax-based log, in accordance with one embodiment of the invention.
Figure 8B:
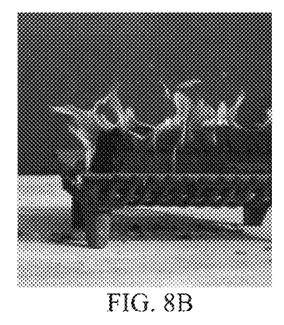
Figure 8C:
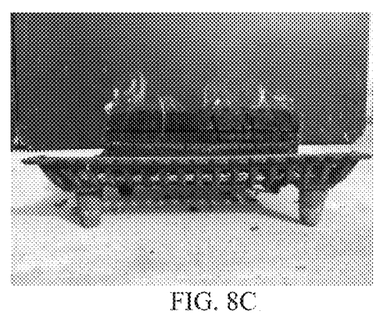
Figure 8D:
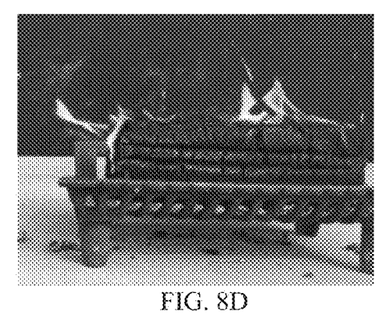
Figure 8E:
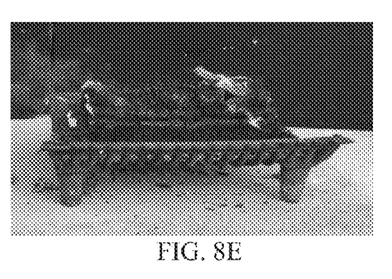
Figure 8F:
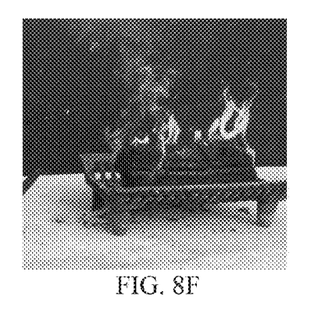
Figure 9A:
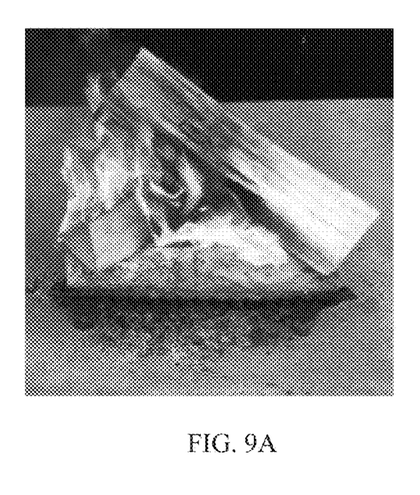
FIGS. 9A-9D include a sequence of photographs of a fire obtained with cordwood, in accordance with one embodiment of the invention.
Figure 9B:
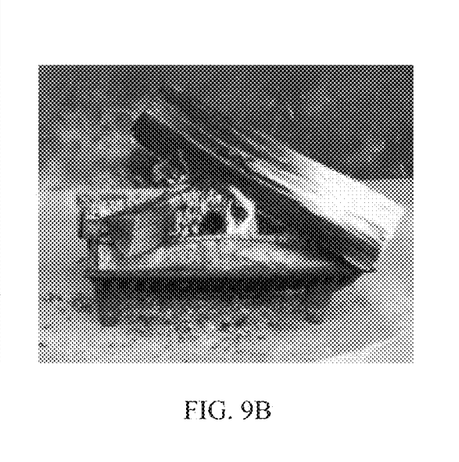
Figure 9C:
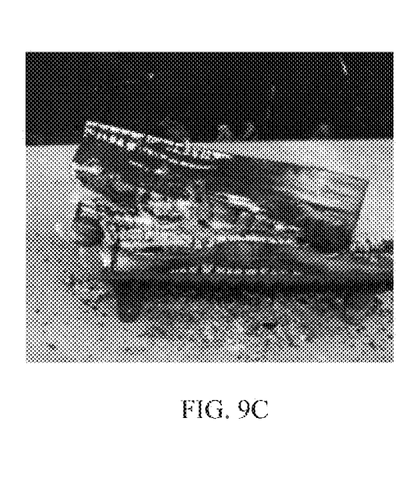
Figure 9D:
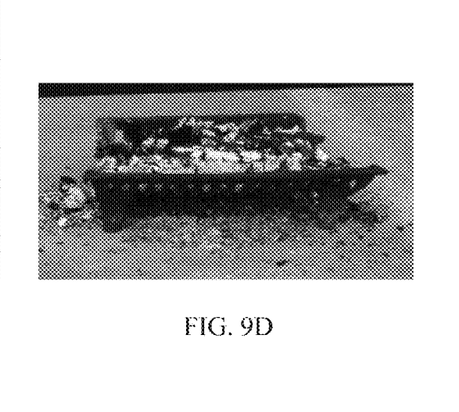

In another experiment, the burning characteristics of the wood product described herein were compared with the burning characteristics of a wax-based log and a stack of cordwood. Results for the wood product, the wax-based log, and the cordwood are presented in FIGS. 7A through 7F, 8A through 8F, and 9A through 9D, respectively. Referring to FIGS. 7A, 8A, and 9A, all three materials were placed on a metal grate prior to ignition. As shown in FIGS. 7B, 8B, and 9B, at about 15 minutes after ignition, all three materials were producing flames. Referring to FIGS. 7C, 8C, and 9C, at about 30 minutes after ignition, the cordwood was readjusted to prevent the cordwood from falling off of the grate. Referring to FIGS. 7D, 8D, and 9D, at about one hour after ignition, the wax-based log and wood product were still producing flames, but the cordwood was no longer producing flames. As depicted in FIGS. 7E and 8E, at one hour and forty minutes after ignition, the wax-based log and wood product were still producing flames. Referring to FIGS. 7F and 8F, at two hours after ignition, two additional log-shaped pieces were placed onto the wood product fire to achieve an additional hour of burn.

FIGS. 7A through 9D do not reveal certain burn characteristics and ambiance features observed during the experiment. For example, compared to the wax-based log, which produced no embers, the wood product described herein produced red hot embers that emitted a substantial amount of heat and produced a soothing visual effect. The embers lasted for about 30 minutes after the wood product stopped producing flames.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention.

The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A composite wood product adapted for burning, the composite wood product comprising:
   lignosulfonate in an amount from about 0.5 wt. % to about 6 wt. %;
   wood particles;
   ground corn in an amount from about 1 wt. % to about 10 wt. %; and
   a moisture content from about 1 wt. % to about 10 wt. %, wherein the composite wood product is characterized by an absence of wax.

2. The composite of claim 1, wherein the lignosulfonate comprises powdered calcium lignosulfonate.

3. The composite of claim 1, wherein the wood particles are present in the composite in an amount of up to about 96 wt. %.

4. The composite of claim 1, wherein the wood particles are sized to pass through a ⅜ inch screen.

5. The composite of claim 1, characterized by an absence of malodorous constituents.

6. The composite of claim 1, further comprising at least one of an herb and a spice.

7. The composite of claim 1 configured as at least one of a disk, a cylinder, a half-cylinder, a bar with a square cross-section, a bar with a square cross-section and rounded edges, and portions thereof.

8. A method of using a composite wood product adapted for burning, the method comprising the steps of:
   providing a composite wood product comprising a blend of lignosulfonate in an amount from about 0.5 wt. % to about 6 wt. %, wood particles, ground corn in an amount from about 1 wt. % to about 10 wt. %, and a moisture content from about 1 wt. % to about 10 wt. %, wherein the composite wood product is characterized by an absence of wax; and
   burning the composite wood product to produce smoke characterized by a lack of malodorous content.

9. The method of claim 8, wherein the wood particles are sized to pass through a ⅜ inch screen.

10. The method of claim 8, wherein the composite wood product comprises at least one of an herb and a spice.

11. The method of claim 8, wherein the composite wood product comprises a plurality of log-shaped pieces and a plurality of starter pieces.

12. The method of claim 11, further comprising arranging the plurality of log-shaped pieces in a bottom layer and placing the plurality of starter pieces on top of the bottom layer.

13. The method of claim 12, further comprising starting a fire by igniting the plurality of starter pieces on top of the bottom layer.

14. The composite of claim 1, wherein the composite comprises a specific gravity from about 1.2 to about 1.4.

15. The composite of claim 1, wherein the composite comprises an ash content from about 0.3 wt. % to about 0.6 wt. %.

16. The composite of claim 1, wherein the composite comprises lignosulfonate in an amount of about 2.5 wt. %.

17. The composite of claim 1, wherein the wood particles are present in the composite in an amount from about 84 wt. % to about 98.5 wt. %.

18. The method of claim 8, wherein the composite wood product comprises a specific gravity from about 1.2 to about 1.4.

19. The method of claim 8, wherein the composite wood product comprises an ash content from about 0.3 wt. % to about 0.6 wt. %.

20. The method of claim 8, wherein the composite wood product comprises lignosulfonate in an amount of about 2.5 wt. %.

21. The method of claim 8, wherein the wood particles are present in the composite in an amount from about 84 wt. % to about 98.5 wt. %.

* * * * *